(12) United States Patent
Diab et al.

(10) Patent No.: US 8,613,085 B2
(45) Date of Patent: Dec. 17, 2013

(54) METHOD AND SYSTEM FOR TRAFFIC MANAGEMENT VIA VIRTUAL MACHINE MIGRATION

(75) Inventors: Wael William Diab, San Francisco, CA (US); Bruce Currivan, Dove Canyon, CA (US); Jeyhan Karaoguz, Irvine, CA (US); Yongbum Kim, San Jose, CA (US); Kenneth Ma, Cupertino, CA (US); Michael Johas Teener, Santa Cruz, CA (US)

(73) Assignee: Broadcom Corporation, Irvine, CA (US)

( * ) Notice: Subject to any disclaimer, the term of this patent is extended or adjusted under 35 U.S.C. 154(b) by 456 days.

(21) Appl. No.: 12/616,535

(22) Filed: Nov. 11, 2009

(65) Prior Publication Data

US 2011/0023114 A1 Jan. 27, 2011

Related U.S. Application Data

(60) Provisional application No. 61/228,377, filed on Jul. 24, 2009.

(51) Int. Cl.
*G06F 11/00* (2006.01)
*G06F 12/14* (2006.01)
*G06F 12/16* (2006.01)
*G08B 23/00* (2006.01)

(52) U.S. Cl.
USPC ................................ 726/22; 703/17; 718/104

(58) Field of Classification Search
None
See application file for complete search history.

(56) References Cited

U.S. PATENT DOCUMENTS

| 5,774,660 | A | * | 6/1998 | Brendel et al. ................ 709/201 |
| 7,409,719 | B2 | * | 8/2008 | Armstrong et al. ............. 726/24 |
| 7,934,020 | B1 | * | 4/2011 | Xu et al. ....................... 709/250 |
| 7,962,647 | B2 | * | 6/2011 | Suri et al. ...................... 709/238 |
| 2004/0268358 | A1 | * | 12/2004 | Darling et al. ................ 718/105 |
| 2008/0016386 | A1 | * | 1/2008 | Dror et al. ......................... 714/4 |
| 2009/0241190 | A1 | * | 9/2009 | Todd et al. ...................... 726/23 |
| 2009/0248870 | A1 | * | 10/2009 | Kamei et al. .................. 709/225 |
| 2010/0011368 | A1 | * | 1/2010 | Arakawa et al. .............. 718/104 |
| 2010/0071025 | A1 | * | 3/2010 | Devine et al. ..................... 726/1 |

* cited by examiner

*Primary Examiner* — Nadia Khoshnoodi
(74) *Attorney, Agent, or Firm* — Brinks Gilson & Lione

(57) ABSTRACT

Aspects of a method and system for traffic management via virtual machine migration include detecting an abnormal traffic pattern in traffic communicated by a first virtual machine that utilizes a first set of network resources. Responsive to the detection of the abnormal pattern, a second virtual machine that utilizes a second set of network resources may be initialized. The second virtual machine may take over functions performed by the first virtual machine and initialization of the second virtual machine is based on an analysis of the traffic. The second virtual machine may be initialized utilizing stored virtual machine state information in instances that the abnormal traffic is a result of a malicious attack. The second virtual machine may be initialized utilizing current virtual machine state information in instances that the abnormal traffic is not a result of a malicious attack.

18 Claims, 8 Drawing Sheets

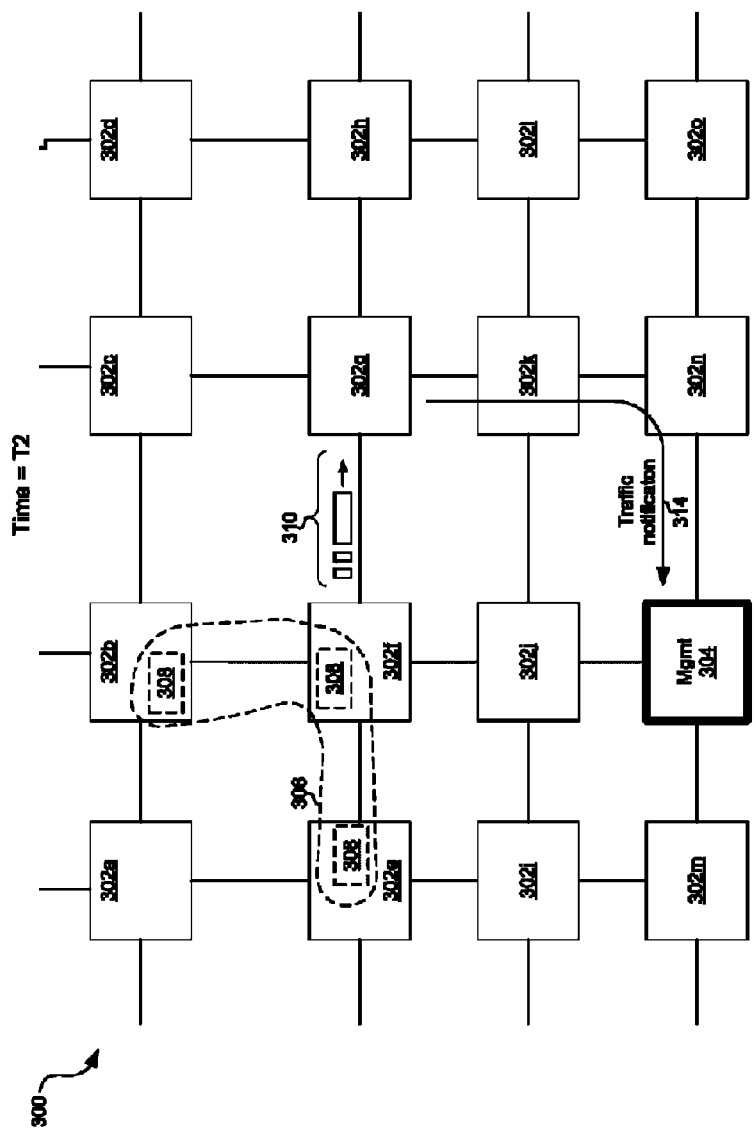

METHOD AND SYSTEM FOR TRAFFIC MANAGEMENT VIA VIRTUAL MACHINE MIGRATION

CROSS-REFERENCE TO RELATED APPLICATIONS/INCORPORATION BY REFERENCE

This patent application makes reference to, claims priority to and claims benefit from U.S. Provisional Patent Application Ser. No. 61/228,377 filed on Jul. 24, 2009.

This application also makes reference to:
U.S. Provisional Patent Application Ser. No. 61/227,665 filed on Jul. 22, 2009;
U.S. patent application Ser. No. 12/571,296 filed on Sep. 30, 2009; and
U.S. Provisional Patent Application Ser. No. 61/227,672 filed on Jul. 22, 2009.

Each of the above stated applications is hereby incorporated herein by reference in its entirety.

FIELD OF THE INVENTION

Certain embodiments of the invention relate to networking. More specifically, certain embodiments of the invention relate to a method and system for traffic management via virtual machine migration.

BACKGROUND OF THE INVENTION

An electronic communication network is a collection of two or more computing nodes, which are communicatively coupled via a transmission medium and utilized for transmitting information. Most networks adhere to the layered approach provided by the open systems interconnect (OSI) reference model. The OSI reference provides a seven (7) layer approach, which includes an application layer, (Layer 7), a presentation layer (layer 6), a session layer (Layer 5), a transport layer (Layer 4), a network layer (Layer 3), a data link layer (Layer 2) and a physical layer (Layer 1). Layer 7 through layer 5 inclusive may comprise upper layer protocols, while layer 4 through layer 1 may comprise lower layer protocols. Some networks may utilize only a subset of the 7 OSI layers. For example, the TCP/IP model, or Internet Reference model generally utilizes a 5 layer model, which comprises an application layer, (Layer 7), a transport layer (Layer 4), a network layer (Layer 3), a data link layer (Layer 2) and a physical layer (Layer 1). These five layers can be broken down into a fairly specific set of responsibilities or services, which they provide.

As electronic communication networks become increasingly popular, ways of exchanging data of various types, sizes for a variety of applications and business and consumers alike want faster and faster network access on more and more devices. Furthermore, malicious traffic and/or other security threats also increase with the increased reliance on electronic information. Consequently, communicating the ever increasing amounts of data and number of devices in a network presents many challenges to network and system designers and administrators.

Virtualization is one area that system designers and administrators have looked to for improving networks. In this regard, in non-virtualized systems, a single machine, for example, a server or a client, may be utilized to concurrently support multiple server operations or services. For example, a single server may be utilized for providing access to business applications while also operating as an email server, a database server, and/or an exchange server. The server may generally support the various server operations by utilizing a single operating system (OS). The server operations, via the single OS, make use of server processing resources such as the central processing unit (CPU), memory, network interface card (NIC), peripheral sound card, and/or graphics card, for example. In many instances, the server resources may not be efficiently utilized because the demand for server operations generally vary based on the type of service provided and/or user needs. Consolidating server services into a single physical machine may result in an improvement in server efficiency. However, consolidation also removes the level of protection that is provided when the operations are maintained separately. For example, when the operations are consolidated, a crash or failure in a database server may also result in the loss of email services, exchange services, and/or application services.

Virtualization, however, may improve server efficiency. Virtualization may comprise utilizing multiple operating systems running concurrently on the server so that each operating system supports a different server operation or application or service, for example. The multiple operating systems may be referred to as guest operating systems (GOSs) or child partitions. This approach maintains the level of protection provided when server operations are not consolidated under a single operating system while also enabling the optimization of the usage of the processing resources available to the server. The use of multiple guest operating systems may be referred to as OS virtualization because each GOS perceives to have full access to the server's hardware resources. In this regard, a GOS is unaware of the presence of any other GOS running on the server. In order to implement OS virtualization, a software layer may be utilized to arbitrate access to the server's hardware resources. This software layer may be referred to as a hypervisor or virtual machine (VM) monitor, for example. The hypervisor may enable the multiple GOSs to access the hardware resources in a time-sharing manner. This software layer may be assisted by a trusted GOS (TGOS), which may also be referred to as a parent partition, or Virtual Machine Kernel (VMK) for instance. Although virtualization is useful in many contexts, it does not address many of the challenges faced by system designers and network administrators, and in-fact, presents many new challenges.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for traffic management via virtual machine migration, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIGS. 3A-3E depict an exemplary network during a series of time intervals to illustrate network management via virtual machine migration, in accordance with an embodiment of the invention.

DETAILED DESCRIPTION OF THE INVENTION

Certain embodiments of the invention may be found in a method and system for traffic management via virtual machine migration. In various embodiments of the invention, an abnormal traffic pattern may be detected in traffic communicated by a first virtual machine that utilizes a first set of network resources. Responsive to the detection of the abnormal pattern, a second virtual machine that utilizes a second set of network resources may be initialized. The second virtual machine may take over functions performed by the first virtual machine and initialization of the second virtual machine is based on an analysis of the traffic. In instances that the abnormal traffic is a result of a malicious attack, the second virtual machine may be initialized utilizing stored virtual machine state information. In this regard, the second virtual machine may be initialized utilizing current virtual machine state information in instances that the abnormal traffic is not a result of a malicious attack.

A third set of resources may be allocated for a third virtual machine that performs the analysis. The traffic associated with the first virtual machine may be communicated to the third virtual machine via a tunneling connection. Communication of the traffic by the first virtual machine may be paused subsequent to the detection of the abnormal pattern. Traffic communicated by the first virtual machine subsequent to the detecting of the abnormal pattern may be tagged or marked. The first set of resources may comprise cache, one or more buffers, and/or one or more memories, and the information associated with the first virtual machine comprises contents of the cache, buffers, and/or said memories. At least a portion of the first set of resources, the second set of resources, and/or the third set of resources may reside on different devices in the network.

Figure 1:
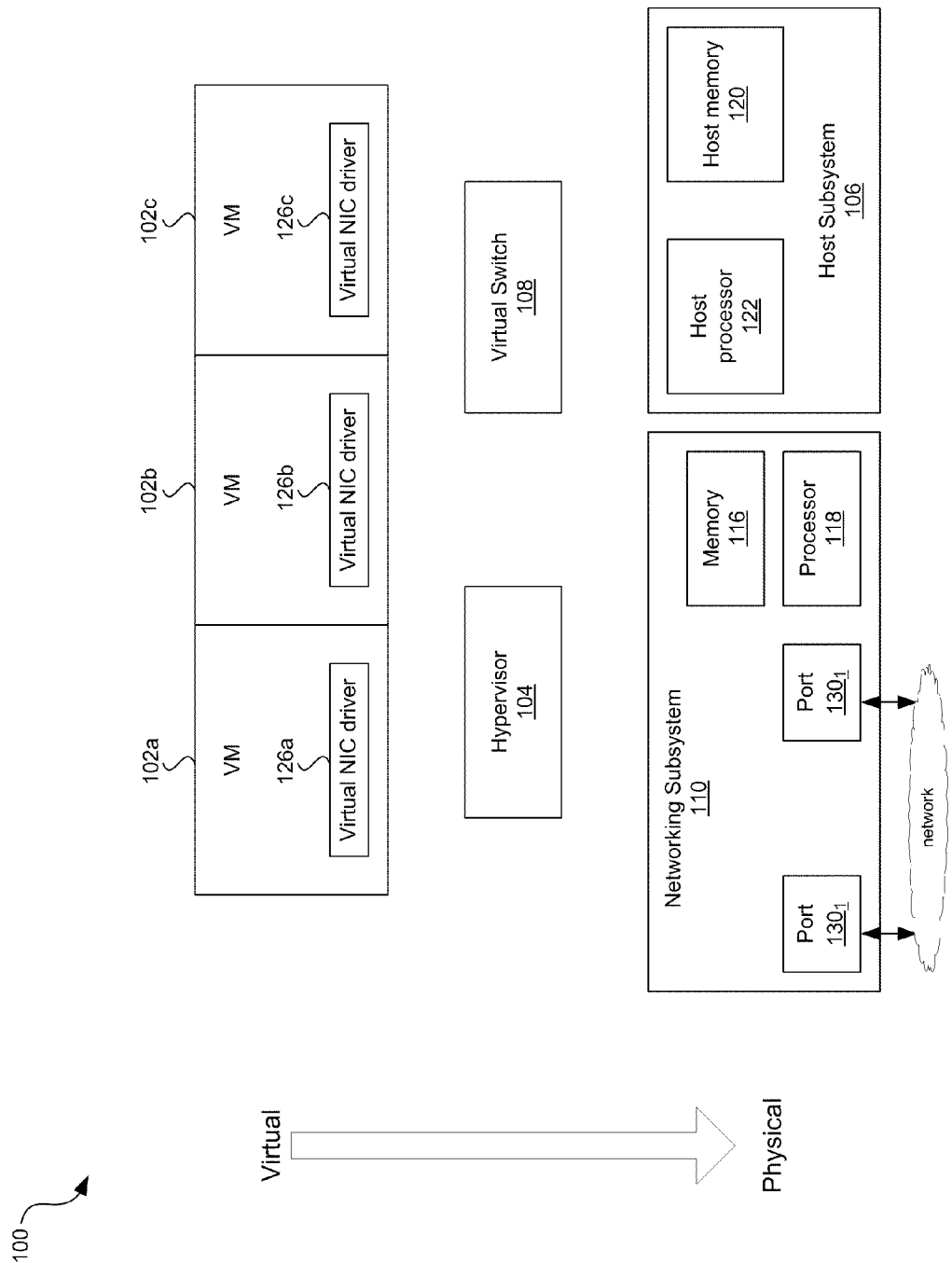
FIG. 1 is a block diagram of a single host system virtual machine implementation, which may be utilized in connection with an embodiment of the invention.

FIG. 1 is a block diagram of a single host system virtual machine implementation, which may be utilized in connection with an embodiment of the invention. Referring to FIG. 1, there is shown a network device 100. The network device 100 may comprise physical resources including a host subsystem 106 and an exemplary networking subsystem 110.

The host system 106 may comprise suitable logic, circuitry, interfaces, and/or code that may enable data processing and/or networking operations, for example. In some instances, the host system 106 may also comprise other hardware resources such as a graphics card and/or a peripheral sound card, for example. The host system 106 may support the operation of the VMs 102a, 102b, and 102c via the hypervisor 104. The VMs 102a, 102b, and 102c may each correspond to an operating system, for example, that may enable the running or execution of operations or services such as applications, email server operations, database server operations, and/or exchange server operations, for example. The number of VMs that may be supported by the host system 106 by utilizing the hypervisor 104 need not be limited to any specific number. For example, one or more VMs may be supported by the host system 106.

The host processor 122 may comprise suitable logic, circuitry, interfaces, and/or code that may be operable to control and/or manage data processing and/or networking operations associated with the host system 106. The processor 122 may be partitioned via, for example, time division multiplexing. For example, each VM supported by the host system 106 may have a corresponding timeslot during which the host processor 122 performs operations for that VM. Moreover, the hypervisor 104 may have a corresponding timeslot. The host memory 120 may comprise suitable logic, circuitry, and/or code that may enable storage of data utilized by the host system 106. The host memory 120 may be partitioned into a plurality of memory portions. For example, each VM supported by the host system 106 may have a corresponding memory portion in the host memory 120. Moreover, the hypervisor 104 may have a corresponding memory portion in the host memory 120. In this regard, the hypervisor 104 and/or the virtual switch 108 may enable data communication between VMs by controlling the transfer of data from a portion of the memory 120 that corresponds to one VM to another portion of the memory 120 that corresponds to another VM.

The hypervisor 104 and/or the virtual switch 108 may operate as a software layer that may enable virtualization of hardware resources in the host system 106 and/or virtualization of physical resources of the network device 100. The hypervisor 104 and/or the virtual switch 108 may allocate hardware resources and also may enable data communication between the VMs and hardware resources in the network device 100. For example, the hypervisor 104 and/or the virtual switch 108 may enable communication between the VMs 102 and the ports $130_1$-$130_N$ of the networking subsystem 110. In instances where a relevant VM 102 is engaged in network transmission or reception, data may travel between a port $130_X$ and a VM 102 after the hypervisor 104 has allocated queues and/or other physical resources and has configured the virtual switch 108.

The networking subsystem 110 may support level 2 (L2) switching and/or higher layer of switching for communication between virtual machines (VMs) in a host system. The switching supported by the networking subsystem 110 need not be limited to L2 only, and may be any combination of L2, VLAN, L3, L4, higher protocol layer and/or additional information including from the administrator as to how to perform the switching. There is also shown virtual machines (VMs) 102a, 102b, and 102c, a hypervisor 104 and a virtual switch 108 running on the network device 100. The host system 106 may comprise a host processor 122 and a host memory 120. The networking subsystem 110 may comprise a processor 118, a memory 116, and 'N' ports $130_1$-$130_N$ for connecting to one or more networks, where N is an integer greater than or equal to one.

The networking subsystem 110 may comprise suitable logic, circuitry, interfaces, and/or code that may enable communication of data with a network. The networking subsystem 110 may enable basic L2 switching, VLAN based switching, TCP offload, iSCSI, and/or RDMA operations, for example. The networking subsystem 110 may be referred to as virtualization-aware because communication with each VM may occur by an independent set of queues. The networking subsystem 110 may determine the right address or combination of address information, such as, for example, VLAN address, L3 address, L4 address, L4 port, among others, to be used in order to select the right target VM. For instance, the networking subsystem 110 may determine the MAC address of received packets and may transfer the received packets to an RX queue that corresponds to the VM with the appropriate MAC address. Similarly, the networking subsystem 110 may enable transfer of packets from the VMs to the network by coordinating and/or arbitrating the order in which packets posted for transmission in TX queues may be transmitted. In this regard, the networking subsystem 110 is said to enable direct input/output (I/O) or hypervisor bypass operations.

Some embodiments of the invention may comprise the networking subsystem 110 that may allow validation, correction, and/or generation of, for example, MAC addresses or VLAN tags or IP addresses or attributes like TOS bits. For example, the networking subsystem 110 may detect that a VM may request a packet to be sent with a wrong source MAC address. The networking subsystem 110 may validate a source MAC address by, for example, comparing the source MAC address for a packet with MAC addresses that may be associated with specific VM or buffers, and/or packet types.

The processor 118 may comprise suitable logic, circuitry, interfaces, and/or code that may enable control and/or management of the data processing and/or networking operations in the networking subsystem 110. The memory 116 may comprise suitable logic, circuitry, and/or code that may enable storage of data utilized by the networking subsystem 110. The networking subsystem 110 may be shared by a plurality of VMs 102a, 102b, and 102c. In some embodiments of the invention, network protocol operations may be offloaded to the networking subsystem 110 and handled by the networking subsystem 110. The offloaded network protocol operations may comprise OSI layer 3, 4, and/or 5 protocol operations, such as, for example, TCP and/or IP operations. The processor 118 may also execute link layer network protocol operations, which may be, for example, OSI layer 2 protocol operations, for example, a VLAN.

In various embodiments of the invention the network device 100 may operate in a cloud computing environment and may be operable to allocate physical and/or virtual resources for providing services over a network.

Figure 2:
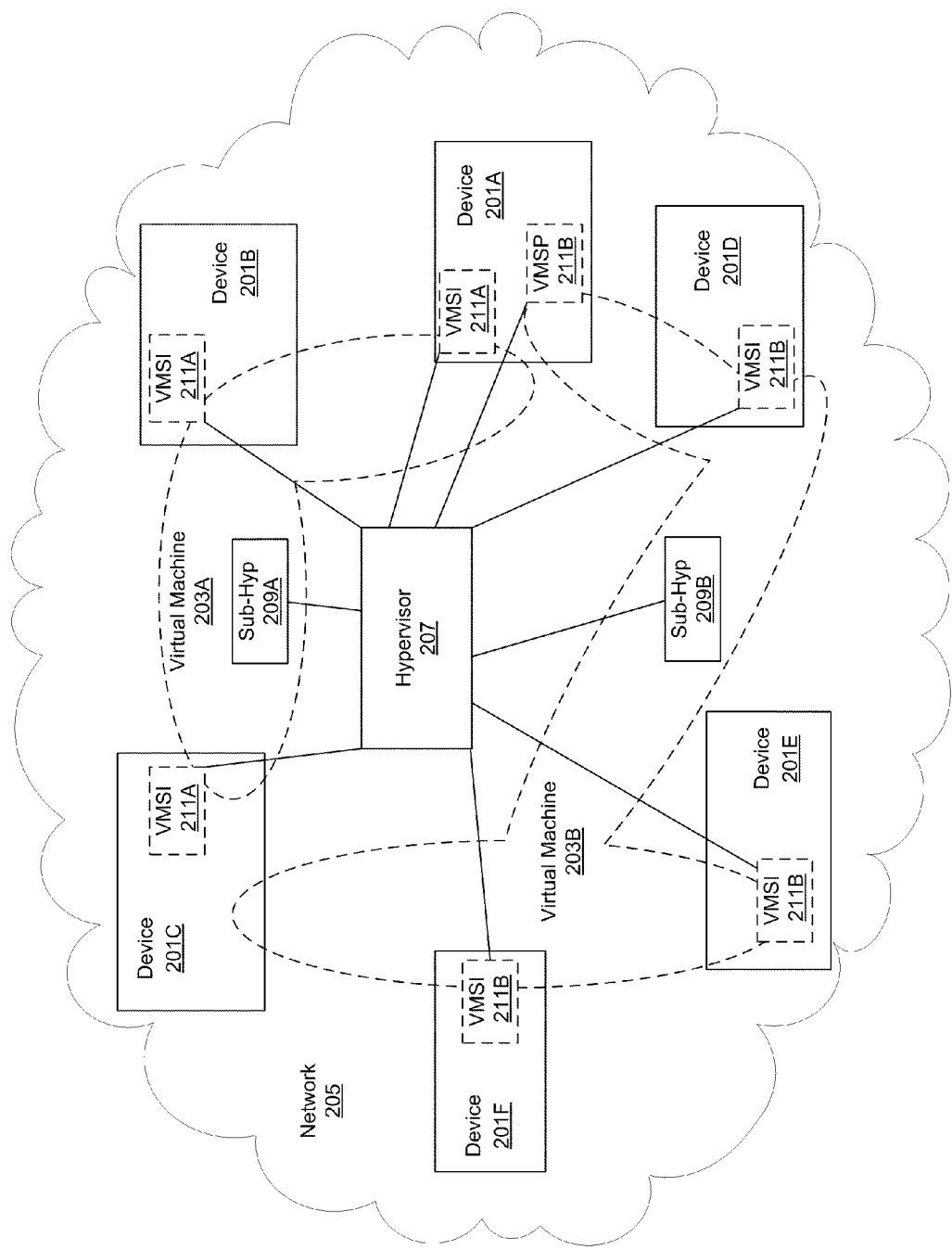
FIG. 2 is a diagram showing virtual machines distributed over networked devices and managed by a distributed hypervisor, in accordance with an embodiment of the invention.

FIG. 2 is a diagram showing virtual machines distributed over networked devices and managed by a distributed hypervisor, in accordance with an embodiment of the invention. Referring to FIG. 2, there is shown devices 201A-201F, virtual machines (VMs) 203A and 203B, a network 205, a hypervisor 207, and sub-hypervisors 209A and 209B.

The devices 201A-201F may comprise suitable circuitry, logic, interfaces, and/or code that may be operable to support the implementation of multiple virtual machines, such as the VMs 203A and 203B, and may comprise desktop computers, servers, switches, personal data assistants, smart phones, routers, racks, blades, mainframes, laptop devices and/or or any hardware resources that may support VM functionality. Various portions of the hardware resources required by each of the VMs 203A and 203B may be supported on a particular one of devices 201A-201F based on resources available in the particular device and the suitability of the resources for supporting a virtual machine. Suitability may be determined based on metrics such as processor speed, storage space, current usage, network bandwidth, and load balancing, for example.

The VMs 203A and 203B may comprise suitable circuitry, logic, interfaces, and/or code that may be operable to perform functions of a machine utilizing software. For example, a VM may comprise an operating system (OS), such as Windows XP, Linux, or the Mac OS, distributed across the network 205. The VMs 203A and 203B may be distributed over a plurality of devices in the network 205 and may be configured for optimum performance utilizing information regarding capabilities of the various devices used to support a particular VM. For example, a VM that may be utilized to perform intensive calculations may be partially supported by a device with high floating-point operations per second (FLOPs) processor capability.

The network 205 may comprise a local area network (LAN), a personal area network (PAN, an enterprise network, or any collection of devices in communication with each other and with the ability to be controlled by a single entity, for example.

The hypervisor 207 may comprise functionality similar to the hypervisor 104 described with respect to FIG. 1, but may be abstracted, or distributed, over the network 205. In this manner, various functionalities of the VMs 203A and 203B may be controlled while distributed over a plurality of devices, such as the devices 201A-201F. The hypervisor 207 may allocate hardware and software resources in the devices 201A-201F and also may enable data communication between the VMs and hardware resources in the devices 201A-201F. For example, the hypervisor 207 may enable communication between the VMs supported devices 201A-201F. In another embodiment of the invention, the hypervisor 207 may control the overall operation of the VMs 203A and 203B, control the flow of information between the various devices supporting a VM 201, and may control the sub-hypervisors 209A and 209B in the VMs 203A and 203B, respectively, essentially comprising a networked hypervisor not tied to any one device.

For the hypervisor 207 to be abstracted in the network 205, the devices 201A-201F may be aware of communication of information to and from processors in the devices 201A-201F as well as configurations of the various devices 201A-201F controlled by the hypervisor 207. Communicated information may comprise the state of a VM 203 and network 205 and may also comprise device 201A-201F resources used by the VMs 203. In this manner, VMs 203 may be configured to balance a load on the network devices 201 and/or the VMs 203 and may optimize the performance of the VMs 203A and 203B. Since the hypervisor 207 and the sub-hypervisors 209A and 209B may be distributed over the network 205, they may be network-aware as opposed to just aware of resources in a single device. Thus, the VM state information may be shared among the devices 201A-201F, enabling dynamic prioritization and resource allocation of the networked devices.

The sub-hypervisors 209A and 209B may comprise suitable circuitry, logic, interfaces, and/or code that may be operable to control operations within a particular VM, while under the control of the hypervisor 207. The sub-hypervisors 209A and 209B may control sub-operations in the VMs 203A and 203B respectively. The sub-hypervisors 209A and 209B may communicate load information of network devices, in which a particular VM may be located, back to the hypervisor 207.

The virtual machine state information (VMSI) 211A and 211B may comprise parameters that define the state of the VMs 203A and 203B. This may comprise locations and status of components of the devices 201A-201F that support a particular function, thread, or component of the VM 203A or 203B. The VMSI 211A and 211B may comprise information such as program content, cache content, memory content, and/or register content, for example. The VMSI 211A and 211B may be stored on one or more of the devices 201A-201F and may be utilized for resilience and fault tolerance in the event of a network failure or fault.

In operation, the VMs 203A and 203B may be enabled to operate utilizing resources of a plurality of the devices 201A-201F. For example, the virtual machine 203A may be distributed over the devices 201A-201D, and the VM 203B may be distribute over the devices 201C-201F. The VMs 203A and 203B may be configured, and resources in the network devices 201 allocated, based on capabilities of the devices 201. The capabilities may be determined via an exchange of parameters, where the parameters may comprise storage capacity, processor usage, access time, communication bandwidth, and/or latency, for example. The parameters may be communicated among the network devices 201A-201F using protocols such as the audio video bridging (AVB) suite of protocols or simple network management protocol (SMNP), for example. In this manner, specified functions within the VMs 203 may be executed within a device 201 with preferred performance with respect to that function. For example, a device 201 with high processor speed may be utilized for processor-intensive functions of a VM 203, and storage-intensive operations may be executed on devices 201 with high storage capacity.

The hypervisor 206 may control the overall distribution and/or configuration of the functionality of the VMs, and may perform load balancing, managing resources in devices 201 across the network 205, thereby enabling scaling and optimization of performance dependent on available network resources, for example. The hypervisor 207 may enable configuration of multiple VMs 203 across the network 205. The hypervisor 207 may control the VMs 203A and 203B via the sub-hypervisors 209A and 209B within the VMs 203. Parameters indicating available resources and capabilities thereof may be communicated to the VMs 203A and 203B via the hypervisor 207. The sub-hypervisors 209A and 209B may communicate the compute load of a particular VM 203 to the hypervisor 207 so that it may configure resources to individual VMs 203 based on the hypervisor 207 traffic awareness. Accordingly, because the VMs 203 are distributed over networked resources, the VMs 203 are scalable limited only by the resources available in the networked resources.

The VMSI 211A and 211B may be stored and/or updated on a continuous, periodic and/or aperiodic basis. In this regard, the VMSI 211A and 211B may be communicated to, and/or collected by, the hypervisor 207 and stored to memory in one or more memories in one or more of the devices 201. The VMSI 211A and VMSI 211B may be utilized such that the VMs 203A and 203B, respectively, may be replicated on and/or migrated to other network resources which may reside on the same or different network devices 201 as the resources currently allocated for the virtual machine.

Figure 3A:
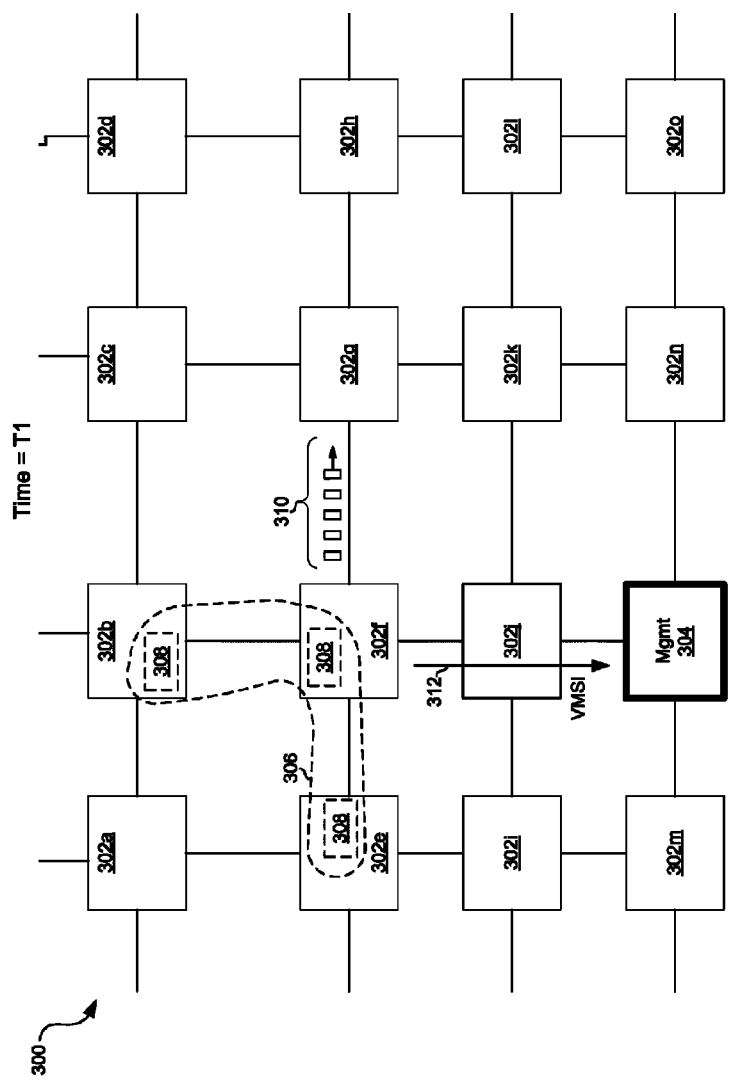

FIGS. 3A-3E depict an exemplary network during a series of time intervals to illustrate network management via virtual machine migration, in accordance with an embodiment of the invention. Referring to FIG. 3A, there is shown a network 300 comprising network devices 302a-302o and a hypervisor and/or management entity 304.

The devices 302a-302o, referenced collectively and individually as device(s) 302, may each be similar to or the same as the devices 100 described with respect to FIG. 1 and/or the devices 201 described with respect to FIG. 2. In various embodiments of the invention, one or more of the network devices 302a-302o may comprise and/or implement virtual and/or physical routers, switches, and/or bridges. In various embodiments of the invention, one or more of the network devices 302a-302o may comprise servers, personal computers, mobile devices and/or other computing platforms operable to interface with a network.

The management entity 304 may comprise suitable logic, circuitry, interfaces, and/or code that may be operable to manage the allocation of resources in the network 300 for the virtual machines. In various embodiments of the invention, the management entity 304 may comprise a physical device and/or may comprise a virtual machine residing on one or more physical devices.

Referring to FIG. 3A, during the time interval T1, a virtual machine 306 utilizing resources 308 in the network devices 302b, 302e, and 302f, may be generating traffic 310. Also, VMSI 312 associated with the virtual machine 306 may occasionally be communicated to, or retrieved by, the management entity 304. The VMSI 312 may be communicated from one or more of the network devices 302b, 302e, and 302f. The VMSI 312 may be stored to back-up the VM 306 such that the VM 306 may be migrated to different resources or recovered in the event of a failure, malicious attack, or other event that could have detrimental effects on performance. With regard to migration, the VM 306, or the functions performed by the VM 306, may be migrated to different resources and/or network devices 302 for a variety of reasons such as: one or more of the devices 302b, 302e, and 302f suffering a malicious attack, one or more of the devices 302b, 302e, and 302f failing, one or more of the resources 308 being needed to perform other functions and/or operations, and/or congestion or overloading in the portion of the network 300 in which the resources 308 reside.

Referring to FIG. 3B, the network 300 is shown during a time interval T2 that follows the time interval T1 depicted in FIG. 3A. During time interval T2, an abnormal traffic pattern may be detected in the traffic 310 communicated by the VM 306. Exemplary reasons for the abnormal traffic pattern may comprise: hardware failure; frozen or corrupted software; a failure of one or more physical or virtual ports failure; a change in network configuration, policies, or rules; power loss to a portion of the network; hardware compromised by a malicious attack; and/or an operating system compromised by a malicious attack. In some embodiments of the invention, the abnormal traffic pattern may be detected by the device 302g receiving the traffic 310 and the device 302g may report the abnormal pattern to the management entity 304 via a message 314. In another embodiment of the invention, the management entity 304 may be a distributed hypervisor, such as the hypervisor 207 described with respect to FIG. 2, and the network awareness of the distributed hypervisor may enable detecting the abnormal traffic pattern. Although the traffic 310 is shown as being communicated from the VM 306 to a device not utilized by the VM 306, traffic between resources 308 of the VM 306 may be monitored for abnormal patterns.

Figure 3C:
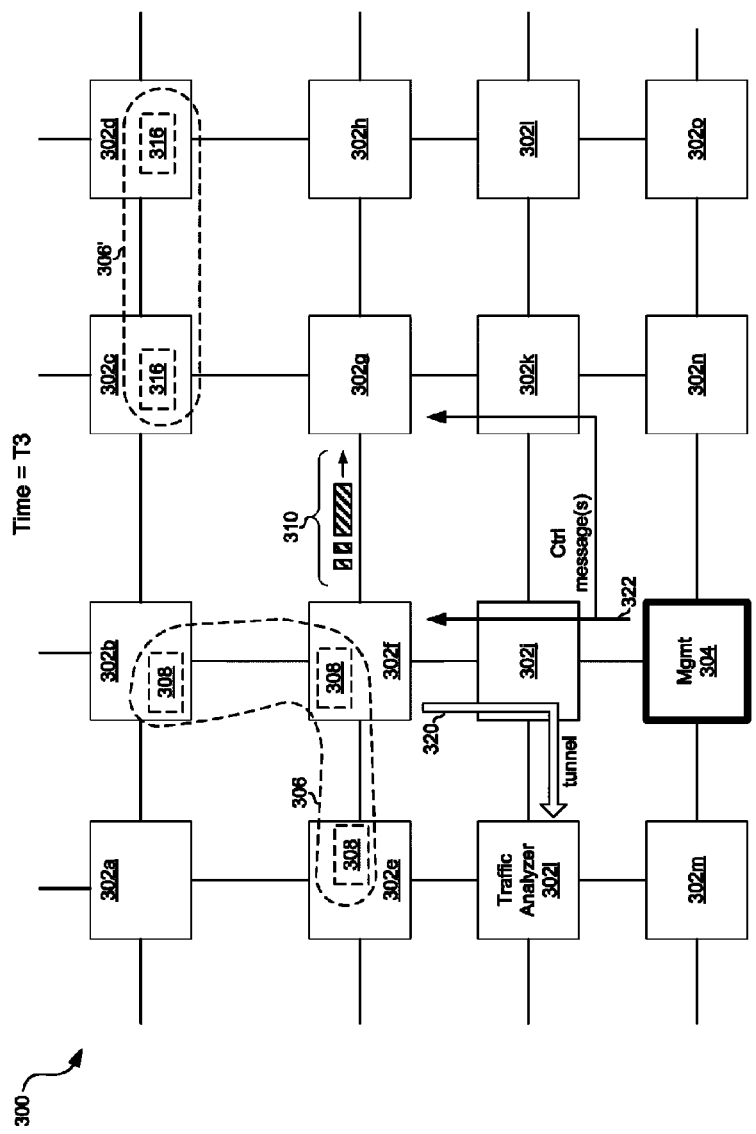

Referring to FIG. 3C, the network 300 is shown during a time interval T3 that follows the time interval T2 depicted in FIG. 3B. During time interval T3, the management entity 304 may send a control message 322 to the device 302f and/or other devices 302 that receive the traffic 310 to instruct the devices 302 on how to handle the suspicious traffic 310. In various embodiments of the invention, the control message(s) 322 may instruct the devices 302 to tag or mark the traffic 310 for further processing, drop the traffic 310, and/or stop communicating the traffic 310.

Also, the control message(s) 322 may set-up a secure and/or tunneling connection between the VM 306 and/or one or more devices 302 that receive the traffic 310. The traffic 310 may be communicated over the tunnel to the network device 302i for analysis. In this regard, the network device 302i may be operable to analyze the traffic 310 to determine whether the abnormal traffic pattern is a result of a malicious attack.

The control message(s) 322 may also allocate resources 316 for a virtual machine 306' in the network devices 302c and 302d. In this regard, the resources 316 may be selected and allocated such that the virtual machine 306' is operable to perform at least some of the functions performed by the virtual machine 306. The resources 316 may be selected based on, for example, location, available resources, and/or load on the network. For example, resources 316 in the network devices 302c and 302d may be selected because the network devices 302c and 302d have a relatively high amount of available resources and/or because there is relatively low amounts of traffic in the portion of the network 300 in which the devices 302c and 302d reside. In this manner, the resources 316 may be selected to balance the load on various resources in the network 300 while still providing a virtual machine 306' that is a functional equivalent of the virtual machine 306. Configuration of the virtual machine 306' may depend on results from the analysis of the traffic 310—as is described below with respect to FIG. 3E.

Figure 3D:
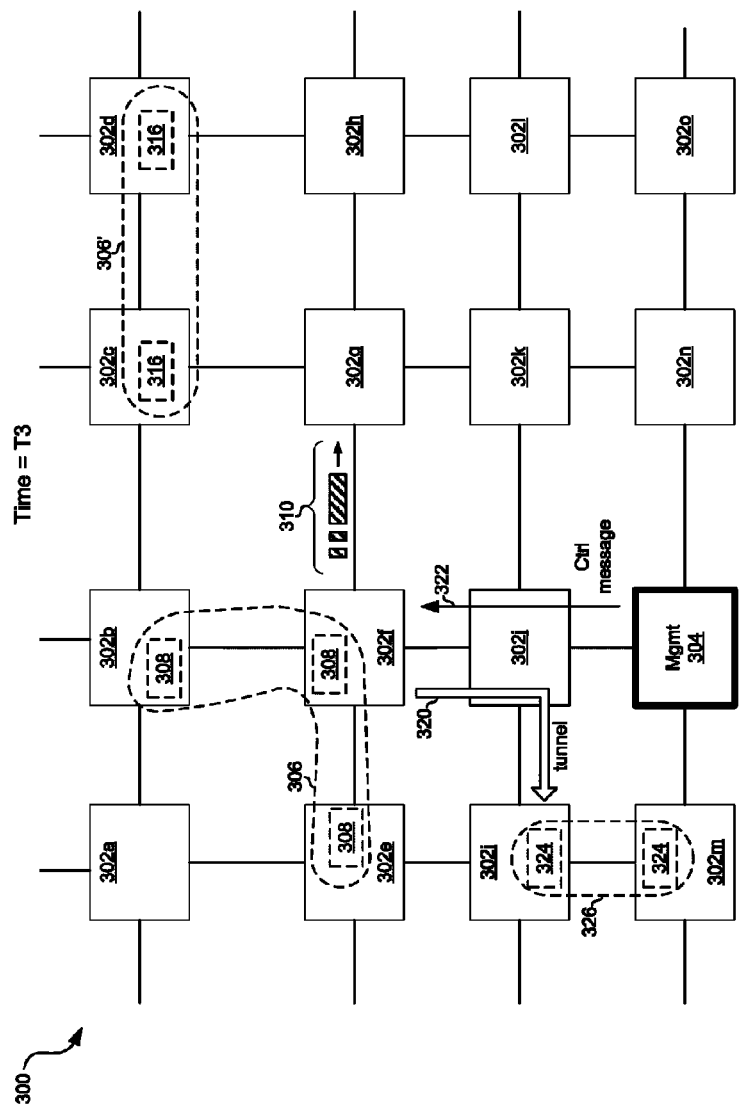

FIG. 3D shows an alternate embodiment of the invention during the time interval T3. In FIG. 3D, the traffic 310 is tunneled to a virtual machine 326. The virtual machine 326 may be operable to analyze the traffic 310 and determine whether the abnormal traffic pattern is a result of a malicious attack. The resources 324 on which the VM 326 operates may be allocated based on the requirements for performing the analysis and/or based on location of available resources. In this regard, it may be desirable to tunnel the suspicious traffic 310 over as few network hops and/or nodes as possible and/or over non-critical hops and/or nodes. Accordingly, in some embodiments of the invention, the resources 324 may be selected to be as close to the VM 306 as possible and/or may be allocated in devices 302 that are more secure or robust than some other devices 302. The resources 324 may be allocated via the control message(s) 322 sent out by the management entity 304.

Figure 3E:
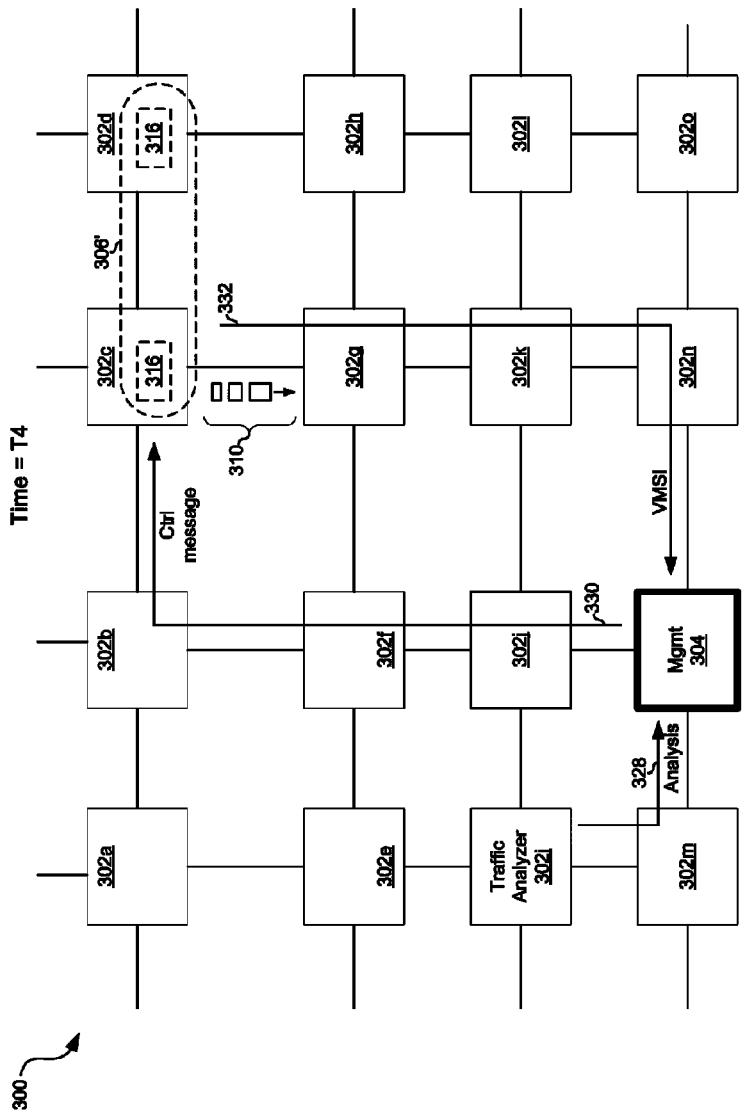

Referring to FIG. 3E, the network 300 is shown during a time interval T4 that follows the time interval T3 depicted in FIGS. 3C and 3D. During time interval T4, once analysis of the traffic 310 is complete, the results 328 may be communicated to the management entity 304 and the management entity 304 may initialize the VM 306' based on the results of the analysis.

In instances that it is determined that the abnormal traffic pattern was a result of non-malicious activity, such as network congestion or overloaded network resources, the VM 306' may be initialized with current state information from the VM 306. In this regard, the VM 306' may be an up-to-date replica of the VM 306 and, in-effect, the VM 306 is migrated to a different portion of the network. This migration may be an attempt to avoid the congestion or other conditions that were causing the abnormal traffic patterns. In this regard, in instances that communication of the traffic 310 was stopped, the VM 306' may take over at least a portion of the functions of the VM 306 and resume communication of the traffic 310 where the VM 306 left off. In instances that the traffic 310 was marked while the analysis of the traffic 310 and set-up of the VM 306' took place, the marked traffic 310 may no longer be treated as suspect. In this manner, the responsibilities and/or functions of the VM 306 may be migrated to different resources and a more balanced load on various devices 302 and/or resources in the network 300 may result. In one embodiment of the invention, in instances that no malicious activity was detected, the VM 306 may be torn down and the resources 308 may be made available for other purposes. In one embodiment of the invention, in instances that no malicious activity was detected, the VM 306 may resume a portion of the functions it previously performed and the VM 306' may take over some of the functions previously performed by the VM 306. In this manner, the load previously on VM 306 may be balanced between VM 306 and VM 306'. In one embodiment of the invention, in instances that no malicious activity was detected, the VM 306 may resume performing the functions it previously performed and the VM 306' may operate in parallel for redundancy.

In instances that it is determined that the abnormal traffic pattern was a result of a malicious activity, such as a virus or hacker, the VM 306' may be initialized with stored or back-up state information from the VM 306. That is, the VM 306' may be initialized to a known-good state of the VM 306 prior to malicious activity. In this manner, the VM 306' may resume operations of the virtual machine 306 from a restore point. In instances of malicious activity, functions of the VM 306 may resume while further efforts are taken to identify and cure the cause of the malicious activity.

Figure 4:
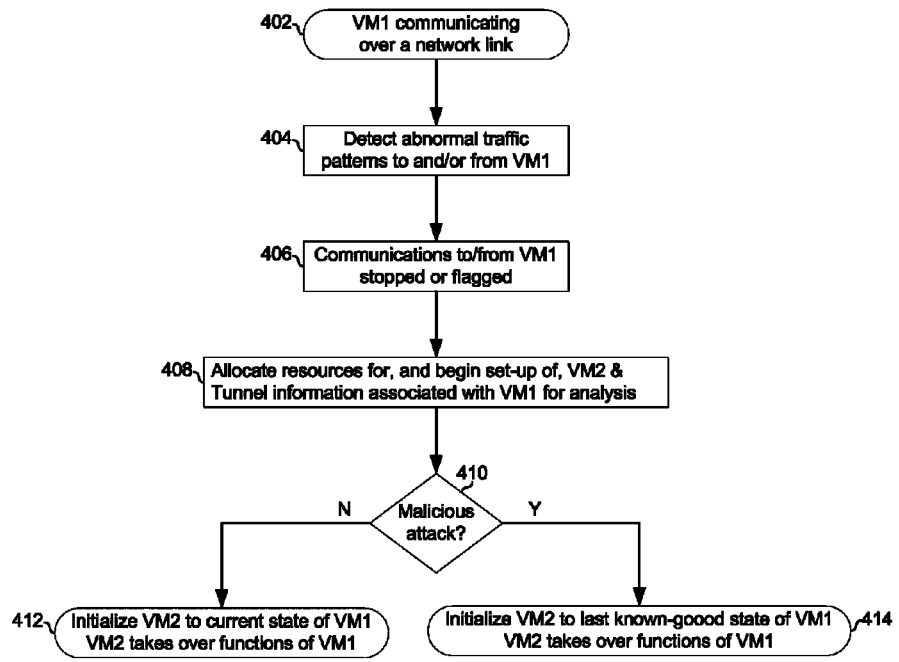
FIG. 4 is a flow chart depicting exemplary steps for network traffic management via virtual machine migration, in accordance with an embodiment of the invention.

FIG. 4 is a flow chart depicting exemplary steps for network traffic management via virtual machine migration, in accordance with an embodiment of the invention. Referring to FIG. 4, the exemplary steps may begin with step 402 when a virtual machine, VM1, is communicating over one or more network links. Subsequent to step 402, the exemplary steps may advance to step 404.

In step 404, an abnormal pattern in the traffic communicated by VM1 may be detected. The abnormal pattern may be detected based on, for example, size of packets being communicated, number of packets being communicated over a period of time, destination of packets being communicated, and/or type of packets being communicated. Additionally or alternatively, the abnormal traffic pattern may be detected based on rules and/or policies in place in the network. Such rules and/or policies may be stored in one or more access control lists (ACLs). Also, such rules and/or policies may be security related and the abnormal traffic pattern may be detected on which traffic is permitted to be sent and/or received by which network devices and/or virtual machines. Furthermore, the abnormal traffic may be detected by monitoring various physical and/or virtual resources. For example, the abnormal traffic may be detected by monitoring: the ports that connect the VM1 to other VMs or device, the ports that connect various portions of the VM1, the state of network resources utilized by the VM1, and/or the state of network devices on which the network resources utilized by the VM1 reside. Subsequent to step 404, the exemplary steps may advance to step 406.

In step 406, the communications by the VM1 may be paused or the traffic may be tagged or marked as suspicious. Network devices receiving the tagged or marked may, for example, drop the traffic, perform extra processing to ensure the traffic is not a virus or otherwise malicious, or may simple buffer the traffic and await a determination of whether the traffic is malicious before processing the traffic. Subsequent to step 406, the exemplary steps may advance to step 408.

In step 408, resources may be allocated for a second virtual machine, VM2, and hardware and/or software may be configured and/or started up in preparation for operation of the VM2. Also in step 408, information associated with VM1 may be tunneled to a network device that is operable to inspect the information to determine whether the abnormal traffic pattern is a result of a malicious attack. For example, the traffic having the abnormal pattern and/or virtual machine state information associated with VM1 may be tunneled to the analyzer. In various embodiments of the invention, the analyzer may be a virtual machine. Subsequent to step 408, the exemplary steps may advance to step 410.

In step 410, the traffic and/or virtual machine state information tunneled to the analyzer may be inspected to see if the traffic is the result of a malicious attack. In this regard, the abnormal traffic pattern may be a result of a malicious attack or may be the result of non-malicious activity such as network congestion, overloaded network resources, and/or failed network resources. In instances that the abnormal network activity is determined to not be associated with a malicious attack, the exemplary steps may advance to step 412.

In step 412, VM2 may be initialized utilizing current virtual machine state information from VM1. In this manner, VM2 may be an up-to-date replica of VM1 and may take over functions and/or communications performed by VM1. In this regard, in instances that communications by VM1 had been paused, VM2 may resume communications right at the point where the communications had been paused. In instances that the communications had been tagged, devices in the network may be instructed to ignore the tagging or marking and VM2 may take over communications at a point following the last marked packet transmitted by VM1.

Returning to step 410, in instances that the abnormal network activity is determined to be the result of a malicious attack, the exemplary steps may advance to step 414. In step 414, VM2 may be initialized utilizing previously stored and known-good virtual machine state information from VM1. In this manner, operation of VM1 may be effectively "rolled back" to a point in time before the attack and operations and/or communications may resume from that point. Any traffic tagged or marked subsequent to the detection of the abnormal traffic patterns may be dropped or may be cleaned and/or secured, if possible.

Various aspects of a method and system for traffic management via virtual machine migration are provided. In various embodiments of the invention, an abnormal traffic pattern may be detected in traffic 310 communicated by a first virtual machine 306 that utilizes a first set of network resources 308. Responsive to the detection of the abnormal pattern, a second virtual machine 306' that utilizes a second set of network resources 316 may be initialized. The second virtual machine 306' may take over functions performed by the first virtual machine 306 and initialization of the second virtual machine 306' is based on an analysis of the traffic 310. The second virtual machine 306' may be initialized utilizing stored virtual machine state information 312 in instances that the abnormal traffic is a result of a malicious attack. The second virtual machine 306' may be initialized utilizing current virtual machine state information in instances that the abnormal traffic is not a result of a malicious attack.

A third set of resources 324 may be allocated for a third virtual machine 326 that performs the analysis. The traffic associated with the first virtual machine 306 may be communicated to the third virtual machine 326 via a tunneling connection 320. Communication of the traffic 310 by the first virtual machine may be paused subsequent to the detection of the abnormal pattern. Traffic 310 communicated by the first virtual machine 306 subsequent to the detection of the abnormal pattern may be tagged or marked. The first set of resources 308 may comprise cache, one or more buffers, and/or one or more memories, and the information associated with the first virtual machine 306 comprises contents of the cache, buffers, and/or said memories. A portion of the first set of resources 308 may reside on different devices 302b, 302e, and 302f in the network. A portion of the second set of resources 316 may reside on different devices 302c and 302d in the network. A portion of the third set of resources 324 may reside on different devices 302i and 302m in the network.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for traffic management via virtual machine migration.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A network device comprising:
 management circuitry configured to:
  identify an abnormal traffic pattern in first network data communicated by a first virtual machine that uses a first set of network resources, and in response:
   select a second set of network resources for use by an analysis virtual machine to analyze the abnormal traffic pattern in subsequent network data communicated by the first virtual machine including:
    selecting, for the second set of network resources, a particular network device with a minimum number of network hops between the particular network device and another network device in the first set of network resources used by the first virtual machine; and
   initialize the analysis virtual machine to use the second set of network resources;
   determine a secure route between the first virtual machine to the analysis virtual machine; and
   configure the first virtual machine to send the subsequent network data to the analysis virtual machine using the secure route.

2. The network device of claim 1, where the management circuitry is further configured to select the second set of network resources by:
 selecting a network device with an increased security capability for use by the analysis virtual machine.

3. The network device of claim 1, where the management circuitry is configured to determine the secure route so the first virtual machine sends the subsequent network data to the analysis virtual machine over the minimum number of network hops between the particular network device and the another network device.

4. The network device of claim 1, where the management circuitry is configured to determine the secure route to include a non-critical network node by:
 identifying the non-critical network node; and
 adding the non-critical network node to the secure route.

5. The network device of claim 1, where the management circuitry is further configured to:
 configure the first virtual machine to send the subsequent network data to the analysis virtual machine through a secure connection.

6. The network device of claim 1, where the management circuitry is further configured to:
 configure an intermediate network node that received the first network data to send the first network data communicated by the first virtual machine to the analysis virtual machine.

7. A method comprising:
 performing by a network device:
  identifying an abnormal traffic pattern in first network data communicated by a first virtual machine that uses a first set of network resources, and in response:
   selecting a second set of network resources for use by an analysis virtual machine to analyze the abnormal traffic pattern in subsequent network data communicated by the first virtual machine including:
    selecting, for the second set of network resources, a particular network device with a minimum number of network hops between the particular network device and another network device in the first set of network resources used by the first virtual machine; and
   initializing the analysis virtual machine to use the second set of network resources;
   determining a secure route between the first virtual machine to the analysis virtual machine; and
   configuring the first virtual machine to send the subsequent network data to the analysis virtual machine using the secure route.

8. The method of claim 7, where selecting the second set of network resources further comprises:
 selecting a network device with an increased security capability for use by the analysis virtual machine.

9. The method of claim 7, comprising determining the secure route so the first virtual machine sends the subsequent network data to the analysis virtual machine over the minimum number of network hops between the particular network device and the another network device.

10. The method of claim 7, comprising determining the secure route to include a non-critical network node by:
 identifying the non-critical network node; and
 adding the non-critical network node to the secure route.

11. The method claim 7 further comprising:
 configuring the first virtual machine to send the subsequent network data to the analysis virtual machine through a secure connection.

12. The method of claim 7, further comprising:
 configuring an intermediate network node that received the first network data to send the first network data communicated by the first virtual machine to the analysis virtual machine.

13. A product comprising:
 a non-transitory computer-readable medium storing instructions, that when executed by a processor, cause a system to:
  identify an abnormal traffic pattern in first network data communicated by a first virtual machine that uses a first set of network resources, and in response:
   select a second set of network resources for use by an analysis virtual machine to analyze the abnormal traffic pattern in subsequent network data communicated by the first virtual machine including:
    selecting, for the second set of network resources, a particular network device with a minimum number of network hops between the particular network device and another network device in the first set of network resources used by the first virtual machine; and
   initialize the analysis virtual machine to use the second set of network resources;
   determine a secure route between the first virtual machine to the analysis virtual machine; and
   configure the first virtual machine to send the subsequent network data to the analysis virtual machine using the secure route.

14. The product of claim 13, where the instructions further cause the system to select the second set of network resources by:
 selecting a network device with an increased security capability for use by the analysis virtual machine.

15. The product of claim 13, where the instructions cause the system to determine the secure route so the first virtual machine sends the subsequent network data to the analysis virtual machine over the minimum number of network hops between the particular network device and the another network device.

16. The product of claim 13, where the instructions cause the system to determine the secure route to include a non-critical network node by:
 identifying the non-critical network node; and
 adding the non-critical network node to the secure route.

17. The product of claim 13, where the instructions further cause the system to:
 configure the first virtual machine to send the subsequent network data to the analysis virtual machine through a secure connection.

18. The product of claim 13, where the instructions further cause the system to:
 configure an intermediate network node that received the first network data to send the first network data communicated by the first virtual machine to the analysis virtual machine.

* * * * *